United States Patent
Leng

(10) Patent No.: US 11,664,699 B1
(45) Date of Patent: May 30, 2023

(54) ENCAPSULATED CYLINDRICAL SHELL STRUCTURE WITH MOTOR

(71) Applicant: Dongguan Guigong Adult Supplies. Co., Ltd., Dongguan (CN)

(72) Inventor: Yongjun Leng, Dongguan (CN)

( * ) Notice: Subject to any disclaimer, the term of this patent is extended or adjusted under 35 U.S.C. 154(b) by 0 days.

(21) Appl. No.: 17/723,429

(22) Filed: Apr. 18, 2022

(30) Foreign Application Priority Data

Mar. 7, 2022 (CN) .......................... 202220504726.9

(51) Int. Cl.
  *H02K 7/14* (2006.01)
  *H02K 5/04* (2006.01)
  *H02K 7/00* (2006.01)

(52) U.S. Cl.
  CPC ................. *H02K 5/04* (2013.01); *H02K 7/00* (2013.01)

(58) Field of Classification Search
  None
  See application file for complete search history.

(56) References Cited

U.S. PATENT DOCUMENTS

| | | | | |
|---|---|---|---|---|
| 3,240,966 A | * | 3/1966 | Thompson | B26B 7/00 310/71 |
| 3,333,830 A | * | 8/1967 | Spingler | A47J 43/082 366/601 |
| 4,062,082 A | * | 12/1977 | Azzopardi | A47L 17/00 15/28 |
| 8,801,861 B2 | * | 8/2014 | Cobabe | A46B 13/02 15/28 |

FOREIGN PATENT DOCUMENTS

| | | |
|---|---|---|
| CN | 2836334 Y | 11/2006 |
| CN | 204972186 U | 1/2016 |

* cited by examiner

*Primary Examiner* — Naishadh N Desai

(57) ABSTRACT

The present disclosure discloses an encapsulated cylindrical shell structure with a motor. The encapsulated cylindrical shell structure includes a second shell and a second shell. The first shell internally has a mounting space; the second shell is inserted into the mounting space; the second shell includes a hard main body and a soft main body; the soft main body is detachably mounted on the hard main body; the hard main body is provided with a first cavity; the soft main body is provided with a second cavity; a first driving mechanism is mounted in the first cavity; and a second driving mechanism is mounted in the second cavity. The first shell made of the elastic material, and the transverse parts can provide an elastic handfeel, so that the flexural resistance generated by the first driving mechanism and the second driving mechanism is effectively reduced, which affects gripping.

10 Claims, 2 Drawing Sheets

ENCAPSULATED CYLINDRICAL SHELL STRUCTURE WITH MOTOR

CROSS REFERENCE TO RELATED APPLICATION

This application claims priority benefit of Chinese Patent Application No. 202220504726.9, filed on Mar. 7, 2022, and the entire contents of which are incorporated herein by reference.

TECHNICAL FIELD

The present disclosure relates to the technical field of shell assembling, in particular to an encapsulated cylindrical shell structure with a motor,

BACKGROUND

In an existing vibrating motor, if one vibrating motor is assembled to one elastic cylindrical shell, it is directly mounted in the shell. However, when it is necessary to mount two or more motors at the same time, the shell is required to include an upper part and a lower part, and the two parts are then assembled together and are correspondingly connected, so as to avoid the mutual influence between the two motors. As a result, the shell cannot be held or is mutually interfered, such as the problem of resonance or unmatched vibration. At the same time, when the two shells are assembled with each other, it is easy to generate a clearance, which easily causes the problem of low sealing property.

SUMMARY

The present disclosure mainly aims to provide an encapsulated cylindrical shell structure with a motor, which is designed to improve mounting structures of motors, so that two motors can be mounted in a same elastic cylindrical shell; the structure has a better sealing property; and the motors are avoided from being damaged.

In order to achieve the above objective, the present disclosure provides an encapsulated cylindrical shell structure with a motor, including:

a first shell which is cylindrical, where transverse parts symmetrically extend out of one end of the first shell; the first shell is made of an elastic material; the first shell internally has a mounting space; and a second shell which is inserted into the mounting space, where the second shell includes a hard main body and a soft main body; the soft main body is detachably mounted on the hard main body; the hard main body is provided with a first cavity; the soft main body is provided with a second cavity; a first driving mechanism is mounted in the first cavity; and a second driving mechanism is mounted, in the second cavity.

Preferably, the first shell includes an upper section and a lower section, and a transitional part for reducing connection is arranged between the upper section and the lower section.

Preferably, the second driving mechanism is a vibrating motor; a hard cover body is arranged in the soft main body; and the vibrating motor is arranged in the hard cover body.

Preferably, a stepped part is provided at an upper end of the hard main body, and the soft main body is provided with a stepped slot matched with the stepped part. Preferably, the first driving mechanism includes:

a rotating motor which is arranged in the hard main body and is connected with an eccentric cam;

a swing member, two sides of which are provided with driving parts, where the swing member is horizontally slidably mounted in the hard main body; the hard main body is provided with through holes matched with the driving parts; the rotating motor is connected with the swing member, and the two driving parts can be forced to do a reciprocating motion and to pass through the through holes to resist against the first shell.

Preferably, the swing member includes a ring body with a driving hole in the middle, and the driving parts arranged on two sides of the ring body; and the eccentric cam extends into the driving hole.

Preferably, the driving hole is provided with an elastic ring.

Preferably, intermediate shells are provided at the through holes; the intermediate shells are arranged between the first shell and the hard main body; the intermediate shells are fitted to the first shell; and the intermediate shells are connected with the driving parts.

Preferably, clamping slots are formed at positions of the through holes on the hard main body, and the intermediate shells are provided with clamping parts matched with the clamping slots.

Preferably, the intermediate shells are provided with limiting slots, and, the driving parts are provided with limiting parts matched with the limiting slots.

According to the technical solutions of the present disclosure, the first shell made of the, elastic material, and the transverse parts can provide an elastic handfed, so that the flexural resistance generated by the first driving mechanism and the second driving mechanism is effectively reduced, which affects gripping. At the same time, the second shell is divided into the hard main body and the soft main body, so that the mutual interference between the first driving mechanism and the second driving mechanism can also be reduced while a supporting degree is provided, thus effectively improving the stability of a product. Furthermore, the first shell is integrated, and has good sealing property.

DETAILED DESCRIPTION OF THE EMBODIMENTS

The technical solutions in the embodiments of the present disclosure will be clearly and completely described below in conjunction with the accompanying drawings. Apparently, the described embodiments are only a part of the embodiments of the present disclosure, rather than all the embodiments. Based on the embodiments in the present disclosure, all other embodiments obtained by those of ordinary skill in the art without doing creative work shall fall within the protection scope of the present disclosure.

It should be noted that if there is a directional indication (such as up, down, left, right, front, back, top, bottom, inner, outer, vertical, transverse, longitudinal, anticlockwise, clockwise, circumferential, radial, axial, . . . ) in the embodiments of the present disclosure, the directional indication is only used to explain a relative positional relationship between components, motions, etc. at a certain specific attitude (as shown in the figures). If the specific attitude changes, the directional indication also correspondingly changes.

In addition, if there are descriptions related to "first", or "second", etc. in the embodiments of the present disclosure, the descriptions of "first", or "second", etc. are only used for descriptive purposes, and cannot be understood as indicating or implying its relative importance or implicitly indicating the number of technical features indicated. Therefore, features defined by "first" and "second" can explicitly instruct or impliedly include at least one feature. In addition, the technical solutions between the various embodiments can be combined with each other, but it must be based on what can be achieved by those of ordinary skill in the art. When the combination of technical solutions is contradictory or cannot be achieved, it should be considered that such a combination of technical solutions does not exist, and is not within the scope of protection claimed by the present disclosure.

Figure 1:
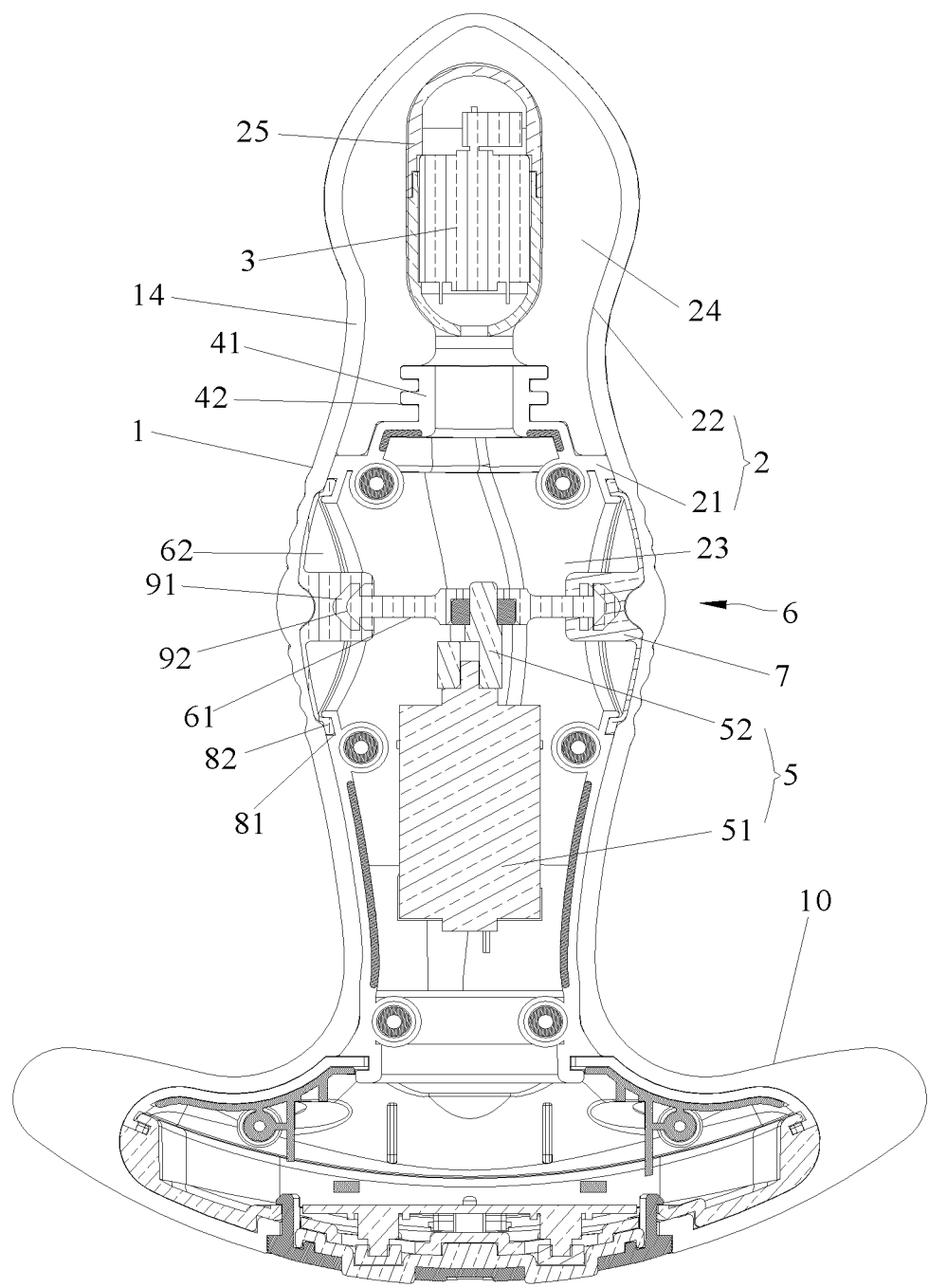
FIG. 1 is a sectional view of the present disclosure.
Figure 2:
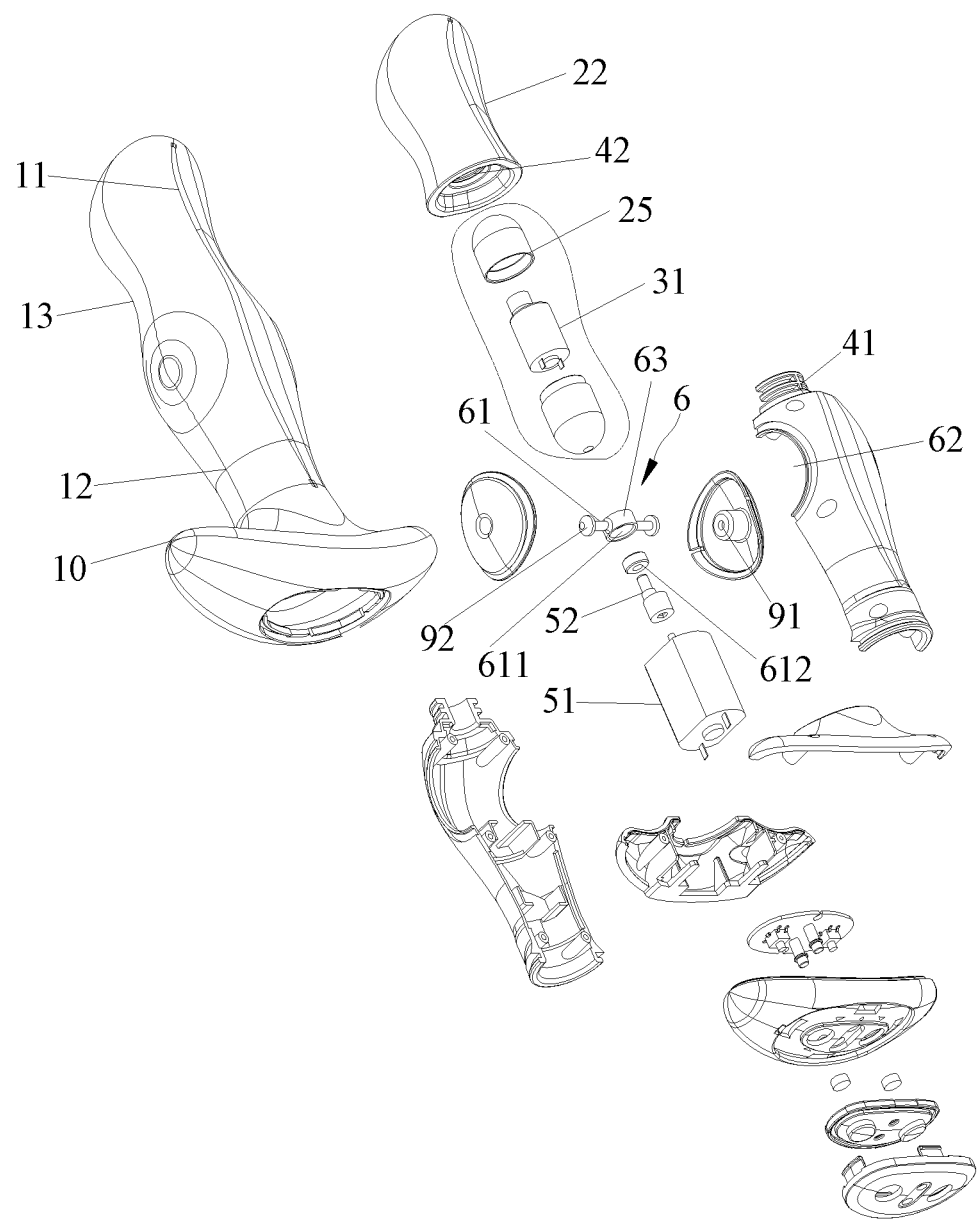
FIG. 2 is an exploded diagram of the present disclosure.
In the drawings: 1: first shell; 10: transverse part; 11: upper section; 12: lower section; 13: transitional part; 14 mounting space; 2: second shell; 21: hard main body; 22: soft main body; 23 first cavity; 24: second cavity; 25: hard, cover body; 3: second driving mechanism; 41: stepped part; 42: stepped slot; 5: first driving mechanism; 51: rotating motor; 52: eccentric cam; 6: swing member; 61: driving part; 611: driving hole; 612 elastic ring; 62: through hole; 63: ring body; 7: intermediate shell; 81: clamping slot; 82: clamping part; 91: limiting slot; 92: limiting part.

As shown in FIGS. 1-2, an encapsulated cylindrical shell structure with a motor includes:

a first shell 1 which is cylindrical, where transverse parts 10 symmetrically extend out of a bottom end of the first shell 1; the first shell 1 is made of an elastic material; the first shell 1 internally has a mounting space 14;

a second shell 2 which is inserted into the mounting space 14, where the second shell 2 includes a hard main body 21 and a soft main body 22; the soft main body 22 is detachably mounted on the hard main body 21; the hard main body 21 is provided with a first cavity 23; the soft main body 22 is provided with a second cavity 24; a first driving mechanism 5 is mounted in the first cavity 23; and a second driving mechanism 3 is mounted in the second cavity 24.

The first shell 1 made of the elastic material, and the transverse parts 10 can provide an elastic handfed, so that the flexural resistance generated by the first driving mechanism 5 and the second driving mechanism 3 is effectively reduced, which affects gripping. At the same time, the second shell 2 is divided into the hard main body 21 and the soft main body 22, so that the mutual interference between the first driving mechanism 5 and the second driving mechanism 3 can also be reduced while a supporting degree is provided, thus effectively improving the stability of a product. Furthermore, the first shell 1 is integrated, and has good sealing property.

In the embodiment of the present disclosure, the first shell 1 includes an upper section 11 and a lower section 12, and a transitional part 13 for reducing connection is arranged between the upper section 11 and the lower section 12. The transitional part 13 can be arranged to respectively limit the hard main body 21 and the soft main body 22. Therefore, an arc-shaped part matched with the transitional part 13 is arranged between the corresponding, hard main body 21 and soft main body 22.

In the embodiment of the present disclosure, the second driving mechanism 3 is a vibrating motor 31; a hard cover body 32 is arranged in the soft main body 22; and the vibrating motor 31 is arranged in the hard cover body 32. The hard cover body 32 forms a support, and vibration of the vibrating motor 31 is transferred onto the soft main body 22 through the hard cover body 32.

In the embodiment of the present disclosure, a stepped part 41 is provided at an upper end of the hard main body 21, and the soft main body 22 is provided with a stepped slot 42 matched with the stepped part 41, so that mounting and fixing of the hard main body 21 and the soft main body 22 are achieved.

In the embodiment of the present disclosure, the first driving mechanism 5 includes:

a rotating motor 51 which is arranged in the hard main body 21 and is connected with an eccentric cam 52;

a swing member 6, two sides of which are provided with driving parts 61, where the swing member 6 is horizontally slidably mounted in the hard main body 21; the hard main body 21 is provided with through holes 62 matched with the driving parts 61; the rotating motor 51 is connected with the swing member 6, and the two driving parts 61 can be forced to do a reciprocating motion, so that the driving parts 61 pass through the through holes 62 to resist against the first shell 1 or leave, the through holes 62.

In the embodiment of the present disclosure, the swing member 6 includes a ring body 63 with a driving hole 611 in the middle, and the driving parts 61 arranged on two sides of the ring body; and the eccentric cam 52 extends into the driving hole 611, thus driving the driving parts 61 to swing along a predetermined trajectory.

In the embodiment of the present disclosure, an elastic ring 612 is arranged in the driving hole 611. Due to the arrangement of the elastic ring 612, vibration generated, by the eccentric cam 52 can be reduced.

In the embodiment of the present disclosure, intermediate shells 7 are provided at the through holes 62; the intermediate shells 7 are arranged between the first shell 1 and the hard main body 21; the intermediate shells 7 are fitted to the first shell 1; and the intermediate shells 7 are connected with the driving parts 61. The intermediate shells 7 are fitted to the first shell 1, so that the driving parts 61 drive the first shell 1 to move, that is, elastic pulling achieves the vibration.

In the embodiment of the present disclosure, clamping slots 81 are formed at positions of the through holes 62 on the hard main body 21, and the intermediate shells 7 are provided with clamping parts 82 matched with the clamping slots 81. Under the extrusion of the first shell 1, the mounting and fixing of the intermediate shells 7 are achieved.

In the embodiment of the present disclosure, the intermediate shells 7 are provided with limiting slots 91, and the driving parts 61 are provided with limiting parts 92 matched with the limiting slots 91. The mounting and fixing of the driving parts 61 and the intermediate shells 7 are achieved. The limiting parts 92 are triangular.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

The invention claimed is:

1. An encapsulated cylindrical shell structure with a motor, comprising:

a first shell (1) which is cylindrical, wherein transverse parts (10) symmetrically extend out of one end of the first shell (1); the first shell (1) is made of an elastic material; the first shell (1) internally has a mounting space (14); and a second shell (2) which is inserted into the mounting space (14), wherein the second shell (2) comprises a hard main body (21) and a soft main body (22); the soft main body (22) is detachably mounted on the hard main body (21); the hard main body (21) is provided with a first cavity (23); the soft main body (22) is provided with a second cavity (24); a first driving mechanism (5) is mounted in the first cavity (23); and a second driving mechanism (3) is mounted in the second cavity (24).

2. The encapsulated cylindrical shell structure with the motor according to claim 1, wherein the first shell (1) comprises an upper section (11) and a lower section (12), and a transitional part (13) for reducing connection is arranged between the upper section (11) and the lower section (12).

3. The encapsulated cylindrical shell structure with the motor according to claim 1, wherein the second driving mechanism (3) is a vibrating motor; a hard cover body (25) is arranged in the soft main body (22); and the vibrating motor is arranged in the hard cover body (25).

4. The encapsulated cylindrical shell structure with the motor according to claim 1, wherein a stepped part (41) is provided at an upper end, of the hard main body (21), and the soft main body (22) is provided with a stepped slot (42) matched with the stepped part (41).

5. The encapsulated cylindrical shell structure with the motor according to claim 1, wherein the first driving mechanism (5) comprises:

a rotating motor (51) which is arranged in the hard main body (21) and is connected with an eccentric cam (52);

a swing member (6), two sides of which are provided with driving parts (61), wherein the swing member (6) is horizontally slidably mounted in the hard main body (21); the hard main body (21) is provided with through holes (62) matched with the driving parts (61); the rotating motor (51) is connected with the swing member (6), and the two driving parts (61) may be forced to do a reciprocating motion and to pass through the through holes (62) to resist against the first shell (1).

6. The encapsulated cylindrical shell structure with the motor according to claim 5, wherein the swing member (6) comprises a ring body (63) with a driving hole (611) in the middle, and the driving parts (61) arranged on two sides of the ring body (63); and the eccentric cam (52) extends into the driving hole (611).

7. The encapsulated cylindrical shell structure with the motor according to claim 6, wherein the driving hole (611) is provided with an elastic ring (612).

8. The encapsulated cylindrical shell structure with the motor according to claim 5, wherein intermediate shells (7) are provided at the through holes (62); the intermediate shells (7) are arranged between the first shell (1) and the hard main body (21); the intermediate shells (7) are fitted to the first shell (1); and the intermediate shells (7) are connected with the driving parts (61).

9. The encapsulated cylindrical shell structure with the motor according to claim 8, wherein clamping slots (81) are formed at positions of the through holes (62) on the hard main body (21), and the intermediate shells (7) are provided with clamping parts (82) matched with the clamping slots (81).

10. The encapsulated cylindrical shell structure with the motor according to claim 8, wherein the intermediate shells (7) are provided with limiting slots (91), and the driving parts (61) are provided with limiting parts (92) matched with the limiting slots (91).

* * * * *